United States Patent
Honda et al.

(10) Patent No.: US 10,240,948 B2
(45) Date of Patent: Mar. 26, 2019

(54) OCCUPANT DETECTION APPARATUS

(71) Applicant: AISIN SEIKI KABUSHIKI KAISHA, Kariya-shi (JP)

(72) Inventors: Isao Honda, Chiryu (JP); Yoshihiro Yamashiro, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/463,781

(22) Filed: Mar. 20, 2017

(65) Prior Publication Data

US 2017/0307415 A1  Oct. 26, 2017

(30) Foreign Application Priority Data

Apr. 26, 2016  (JP) .................... 2016-088178

(51) Int. Cl.
  *B60N 2/00* (2006.01)
  *G01D 5/241* (2006.01)
  *B60N 2/70* (2006.01)

(52) U.S. Cl.
  CPC ........... *G01D 5/2417* (2013.01); *B60N 2/002* (2013.01); *B60N 2/7094* (2013.01)

(58) Field of Classification Search
  CPC ..................... B60N 2/002; B60R 21/01532
  See application file for complete search history.

(56) References Cited

U.S. PATENT DOCUMENTS

| | | | |
|---|---|---|---|
| 6,366,200 B1 * | 4/2002 | Aoki .................... | B60N 2/002 177/210 C |
| 6,450,046 B1 * | 9/2002 | Maeda .................. | B60N 2/002 73/862.451 |
| 7,059,446 B2 | 6/2006 | Murphy et al. | |
| 7,575,085 B2 | 8/2009 | Kamizono et al. | |
| 8,296,099 B2 | 10/2012 | Ito et al. | |
| 8,919,211 B1 * | 12/2014 | Hanson .................. | G01L 1/146 73/862.626 |
| 2002/0020223 A1 * | 2/2002 | Kume ..................... | G01G 3/12 73/763 |
| 2004/0160110 A1 * | 8/2004 | Enomoto ............... | B60N 2/002 297/452.5 |
| 2011/0115500 A1 * | 5/2011 | Stanley .................. | B60N 2/002 324/661 |
| 2012/0098548 A1 * | 4/2012 | Hayakawa ............. | B60N 2/002 324/601 |
| 2012/0161793 A1 * | 6/2012 | Satake ................... | B60N 2/002 324/658 |
| 2012/0161953 A1 * | 6/2012 | Nakagawa ............. | B60N 2/002 340/438 |

(Continued)

FOREIGN PATENT DOCUMENTS

| | | |
|---|---|---|
| JP | 2006-242907 | 9/2006 |
| JP | 2011-16424 | 1/2011 |

*Primary Examiner* — Patrick Assouad
*Assistant Examiner* — Demetrius R Pretlow
(74) *Attorney, Agent, or Firm* — Oblon, McClelland, Maier & Neustadt, L.L.P.

(57) ABSTRACT

An occupant detection apparatus includes: a sensor electrode; a conductor portion facing the sensor electrode; a moving object that moves by input of a seat load loaded on a seat and changes an electrostatic capacitance between the sensor electrode and the conductor portion; and a signal output unit that outputs a sensor signal based on the electrostatic capacitance.

7 Claims, 8 Drawing Sheets

(56) References Cited

U.S. PATENT DOCUMENTS

| | | | |
|---|---|---|---|
| 2013/0234736 A1* | 9/2013 | Ootaka | G01R 27/2605 |
| | | | 324/679 |
| 2014/0250642 A1* | 9/2014 | Yamanaka | B60N 2/002 |
| | | | 24/455 |
| 2017/0210245 A1* | 7/2017 | Yamoto | B60N 2/002 |
| 2018/0086228 A1* | 3/2018 | Nakazaki | B60N 2/002 |

* cited by examiner

SEATING SURFACE DIRECTION OF SEAT

AT NO LOAD

AT LOW LOAD

AT HIGH LOAD

OCCUPANT DETECTION APPARATUS

CROSS REFERENCE TO RELATED APPLICATIONS

This application is based on and claims priority under 35 U.S.C. § 119 to Japanese Patent Application 2016-088178, filed on Apr. 26, 2016, the entire contents of which are incorporated herein by reference.

TECHNICAL FIELD

This disclosure relates to an occupant detection apparatus.

BACKGROUND DISCUSSION

In the related art, an occupant detection apparatus of a vehicle may detect a seat load by using a strain sensor provided between a seat frame and a slide rail, as described in, for example, JP 2011-16424A (Reference 1). Further, for example, as described in JP 2006-242907A (Reference 2), an electrostatic capacitance sensor in which a sensor electrode is disposed inside a seat skin is used. Further, for example, in an occupant detection apparatus described in U.S. Pat. No. 7,059,446 (Reference 3), a bladder (bag body) filled with a liquid (gel) is disposed below a seat cushion. Then, it is configured to detect the seated state of the occupant on the seat, based on the internal pressure change of the bag body.

However, in a technique in the related art described in Reference 1, for example, a strain sensor provided in the frame of a seat is likely to be affected by a shape change or a position change occurring in the installation location thereof, when a seat operation such as sliding or reclining a seat is performed, or a collision occurs. An error caused by this may hamper the improvement of detection accuracy. A technique in the related art described in Reference 2 has a structure in which a sensor electrode of an electrostatic capacitance sensor radiates electric force lines in the seating surface direction of a seat. Therefore, for example, there is a problem that it is likely to be affected by disturbance of which a noise source is a liquid such as a beverage or an electronic device (such as a personal computer) placed on a seat. In a configuration for detecting an internal pressure of a bladder filled with liquid as a technique in the related art described in Reference 3, the liquid in the bladder is likely to be affected by a temperature change, and thus there is a problem that it is difficult to secure stability of load detection thereof.

Thus, a need exists for an occupant detection apparatus which is not susceptible to the drawback mentioned above.

SUMMARY

It is preferable that an occupant detection apparatus according to an aspect of this disclosure includes a sensor electrode, a conductor portion facing the sensor electrode, a moving object that moves by input of a seat load loaded on a seat and changes an electrostatic capacitance between the sensor electrode and the conductor portion, and a signal output unit that outputs a sensor signal based on the electrostatic capacitance.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of an occupant detection apparatus provided in a seat for a vehicle will be described with reference to the drawings.

Figure 1:
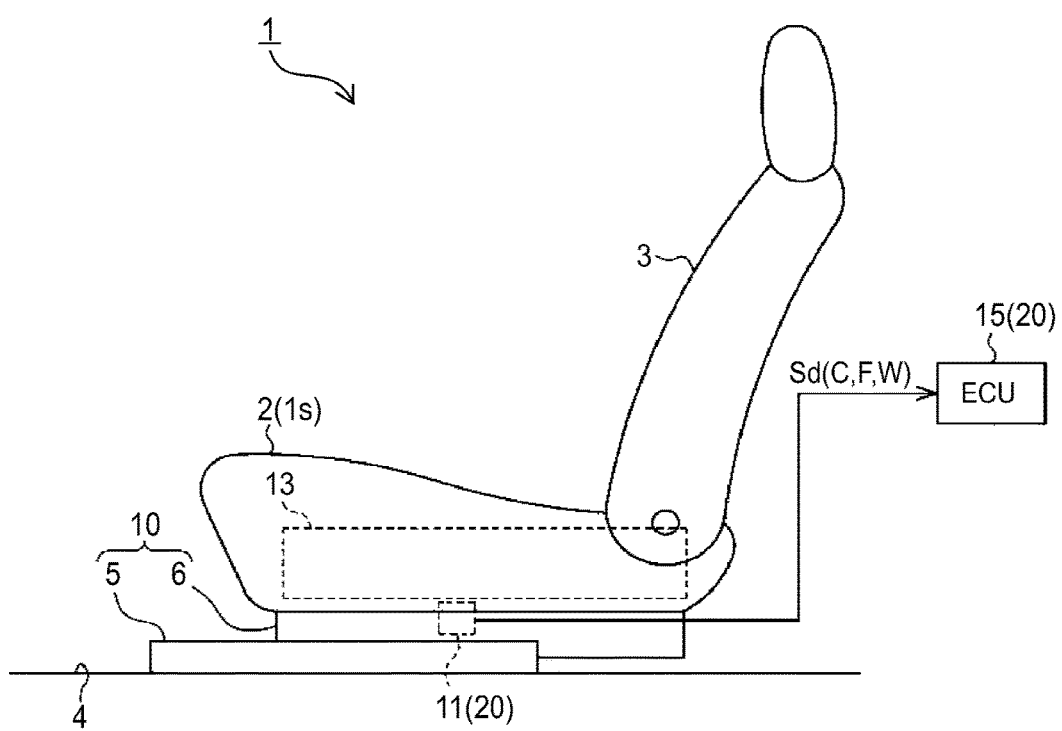
FIG. 1 is a schematic configuration diagram of an occupant detection apparatus installed in a seat of a vehicle.

As shown in FIG. 1, a seat 1 for a vehicle includes a seat cushion 2 and a seatback 3 provided at a rear end portion of the seat cushion 2. In the present embodiment, a pair of left and right lower rails 5 extending in the longitudinal direction of the vehicle are provided on the floor portion 4 of a vehicle. Upper rails 6 relatively moving on the lower rails 5 along the extending direction are respectively attached to the respective lower rails 5. The seat 1 of this embodiment is supported above a seat slide device 10 configured with the lower rails 5 and the upper rails 6.

Figure 2:
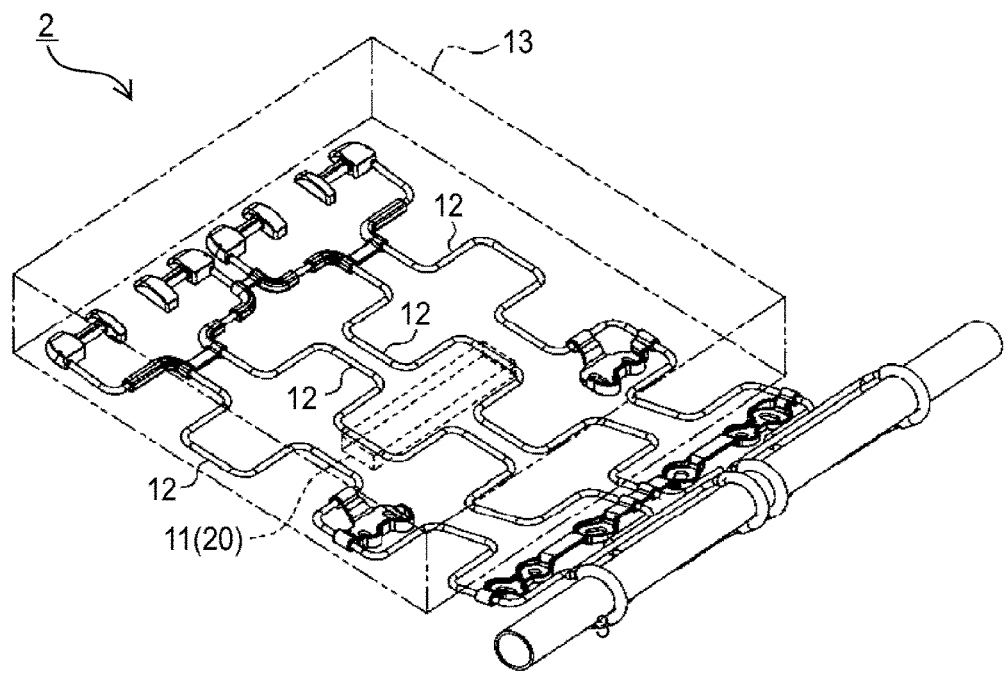
FIG. 2 is a diagram showing a load sensor disposed under the cushion pad.

As shown in FIGS. 1 and 2, in the seat 1 of the present embodiment, the seat cushion 2 is provided with a load sensor 11. Specifically, the seat cushion 2 of the present embodiment is configured to support a cushion pad 13 above the cushion spring 12. Further, the load sensor 11 is disposed under the cushion pad 13 by being fixed to the cushion spring 12. Further, a sensor signal Sd output from the load sensor 11 is input to an electronic control unit (ECU) 15 which is a control device. Thus, in the present embodiment, an occupant detection apparatus 20 capable of detecting the seated state of an occupant on the seat 1 is configured in this way.

The cushion pad 13 of the present embodiment is formed of a sponge material such as foamed urethane, for example. As the cushion spring 12, a so-called "S spring" continuously bent in an S shape is used. Furthermore, in the present embodiment, the mounting position of the load sensor 11 is optimized based on the evaluation and analysis of the load propagation state of the seat 1. The occupant detection apparatus 20 of the present embodiment allows a single load sensor 11 to perform appropriate occupant detection.
(Load Sensor)

Next, the configuration of the load sensor 11 of the present embodiment will be described.

Figure 3:
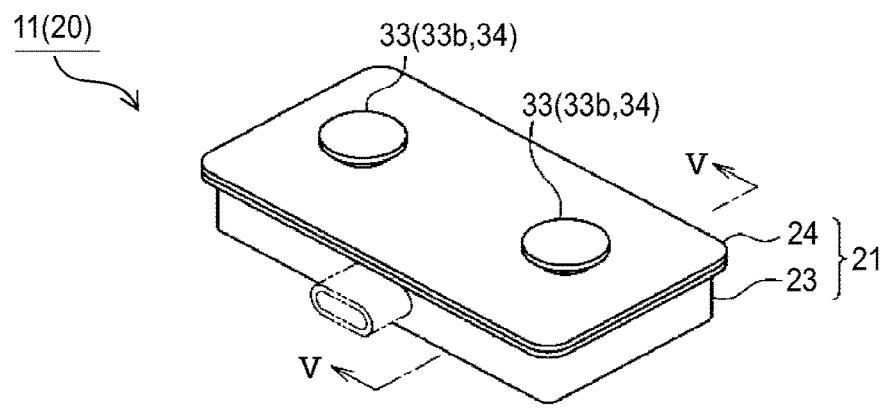
FIG. 3 is a perspective view of the load sensor.
Figure 4:
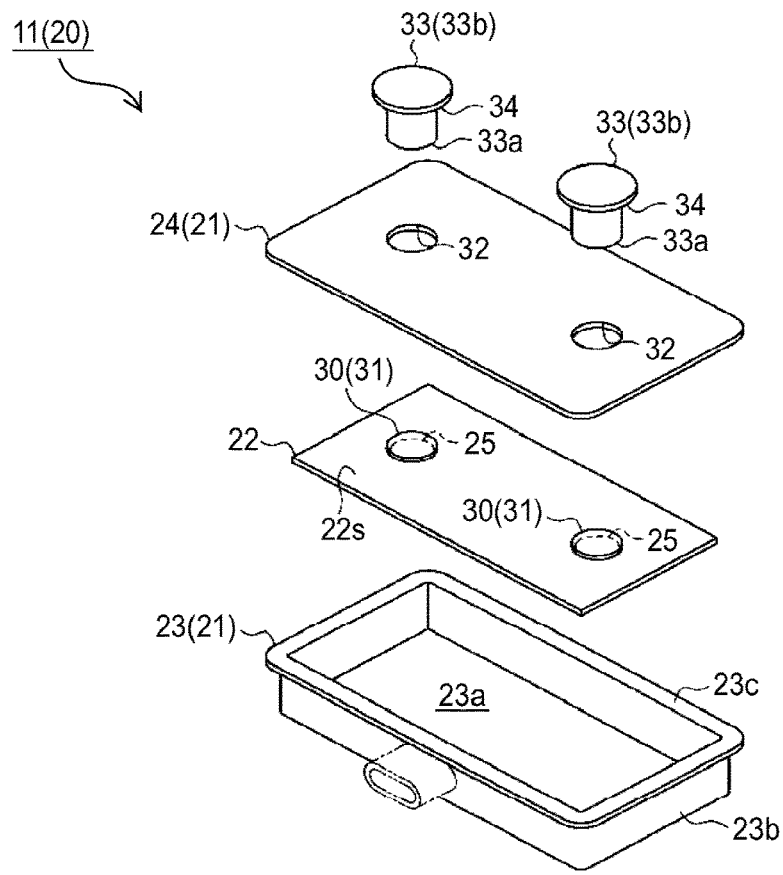
FIG. 4 is an exploded perspective view of the load sensor.
Figure 5:
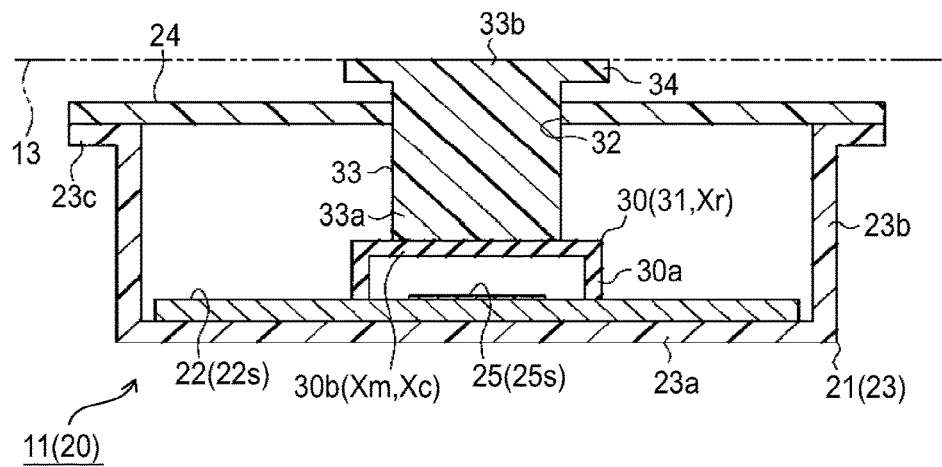
FIG. 5 is a cross-sectional view of the load sensor (V-V cross section in FIG. 3)

As shown in FIGS. 3 to 5, the load sensor 11 of the present embodiment has a case 21 having an outer shape of a flattened substantially rectangular box shape and fixed to the cushion spring 12, and a sensor board 22 housed in the case 21.

Specifically, the case 21 of the present embodiment includes a case main body 23 having a flange portion 23c at a tip portion of a circumferential wall portion 23b erected on a peripheral edge of the bottom plate portion 23a, and a rectangular substantially flat plate-like lid portion 24 for closing the opening end of the case main body 23 by being fixed to the flange portion 23c. Further, the sensor board 22 of the present embodiment has a pair of sensor electrodes 25 of the rectangular flat plate shape provided in two positions spaced apart in the longitudinal direction. Then, in a state in which the surface 22s provided with the sensor electrodes 25 faces the opening end side (the upper side in FIG. 5) of the case main body 23, it is fixed to the bottom plate portion 23a thereof.

Furthermore, in the load sensor 11 of the present embodiment, the cover member 30, which has a gap between the load sensor 11 and the detection surface 25s of each sensor electrode 25 exposed on the surface 22s of the sensor board 22 and covers each of the sensor electrodes 25 is provided. For convenience of explanation, it is assumed that the cover member 30, the sensor electrode 25, and a load transmission member 33 to be described later are exaggerated in size, respectively.

Specifically, each cover member 30 of the present embodiment has a flat and substantially cylindrical shape with a lid. In addition, these cover members 30 are fixed to the sensor board 22 in a state where the tip of the circumferential wall 30a abuts against the surface 22s of the sensor board 22. Thus, the ceiling portion 30b having a substantially disk shape corresponding to the cover portion is configured to cover the sensor electrode 25, in a state of facing the surface 22s of the sensor board 22.

In the load sensor 11 of the present embodiment, each of these cover members 30 is formed using a conductive rubber 31 having elasticity. Further, a pair of insertion holes 32 penetrating the lid portion 24 in the thickness direction (vertical direction in FIG. 5) are provided at two positions facing the respective cover members 30, in the lid portion 24 of the case 21. The load sensor 11 of the present embodiment includes a pair of load transmission members 33 inserted through the respective insertion holes 32.

Specifically, in the load sensor 11 of the present embodiment, each load transmission member 33 has a substantially columnar outer shape having the same diameter as (or slightly smaller than) the diameter of each of the insertion holes 32 provided in the lid portion 24 of the case 21. In addition, each of the load transmission members 33 is configured such that one end side in the axial direction (the lower end portion, the pressing end 33a in FIG. 5) is inserted into each insertion hole 32 at a state of abutting against the ceiling portion 30b of the cover member 30, and thus the other end side in the axial direction (the upper end portion, the pressure receiving end 33b in FIG. 5) projects outside the case 21. A flange portion 34 having a substantially disk shape which expands radially outward is provided on the pressure receiving end 33b side of each of the load transmission members 33.

In addition, the load sensor 11 of the present embodiment is fixed to the cushion spring 12 with the lid portion 24 of the case 21 facing upward. Thus, it is configured that the cushion pad 13 comes into contact with (the flange portion 34 of) the pressure receiving end 33b of each of the load transmission members 33 projecting outside the case 21 from each insertion hole 32, from the upper side.

In other words, in the load sensor 11 of the present embodiment, the cushion pad 13 pushes down each load transmission member 33 based on the seat load W input to the seating surface 1s of the seat 1, such that each of the load transmission members 33 presses the ceiling portion 30b of each of the cover members 30 fixed to the sensor board 22 inside the case 21. Furthermore, the load sensor 11 of the present embodiment is configured such that the electrostatic capacitance between the ceiling portion 30b of each cover member 30 and each sensor electrode 25 is changed by each cover member 30 being elastically deformed as described above. The load sensor 11 of the present embodiment is configured to output the sensor signal Sd based on the electrostatic capacitance between the sensor electrode 25 and the ceiling portion 30b of the cover member 30 to the ECU 15.

Figure 6:
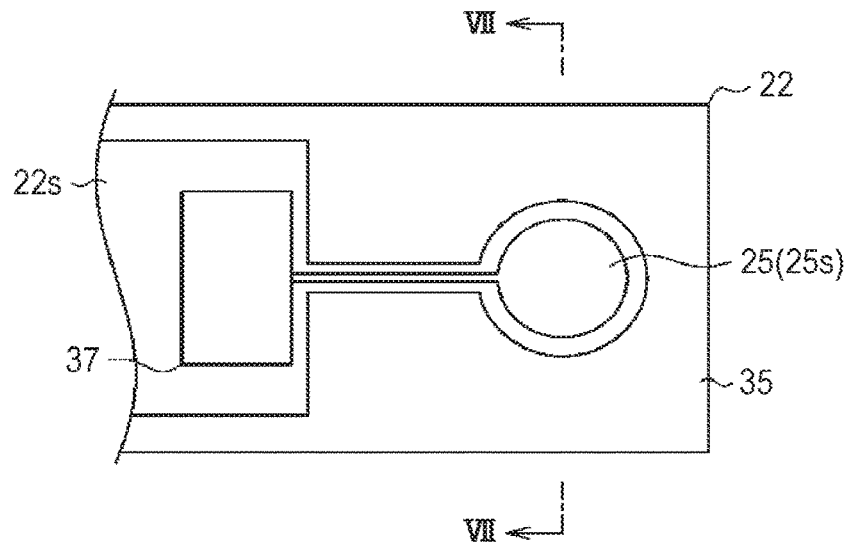
FIG. 6 is a plan view of a sensor board.

Specifically, as shown in FIG. 6, in the load sensor 11 of the present embodiment, a substantially circular sensor electrode 25 is formed on the surface 22s of the sensor board 22, and a ground electrode 35 is formed so as to surround the peripheral edge of the sensor electrode 25. The cover member 30 of the present embodiment is fixed to the sensor board 22 in a state where the tip of the circumferential wall 30a abuts against the ground electrode 35 formed on the surface 22s of the sensor board 22. Further, a sensor IC 37 for driving the sensor electrode 25 to a predetermined detection potential is mounted on the surface 22s of the sensor board 22. The load sensor 11 of the present embodiment is configured to output the detected sensor signal Sd based on the electrostatic capacitance C between the sensor electrode 25 and the ceiling portion 30b of the cover member 30, specifically, the sensor signal Sd of which the output level changes depending on the value, to the ECU 15.

Figure 7:
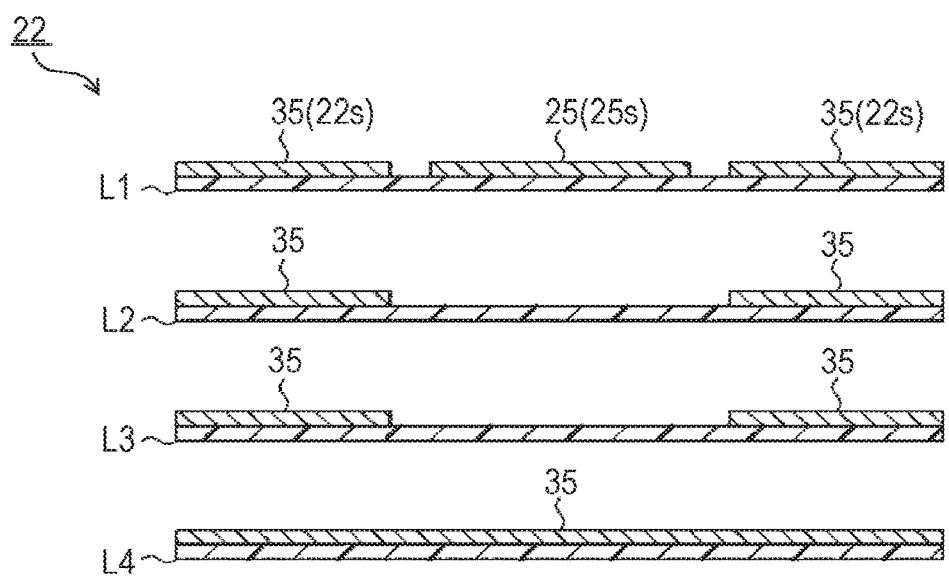
FIG. 7 is an exploded perspective view of the sensor board (VII-VII cross section in FIG. 6)

More specifically, as shown in FIG. 7, the sensor board 22 of the present embodiment is formed by stacking four circuit boards L1 to L4. Specifically, the sensor electrode 25 and the ground electrode 35 surrounding the radially outer side of the sensor electrode 25 are formed on the uppermost circuit board L1. On the circuit board L4 of the lowermost layer (fourth layer), the ground electrode 35 is formed on the entire surface of the mounting surface (the upper surface in FIG. 7). Further, on the respective circuit boards L2 and L3 constituting the intermediate layers (the second layer and the third layer), a ground electrode 35 is formed so as to surround the portion where the sensor electrodes 25 is formed in the circuit board L1 of the uppermost layer. The sensor board 22 of the present embodiment is configured so that the ground electrode 35 shields lines of electric force radiated from portions other than the detection surface 25s exposed on the surface 22s of the sensor board 22.

Figure 8:
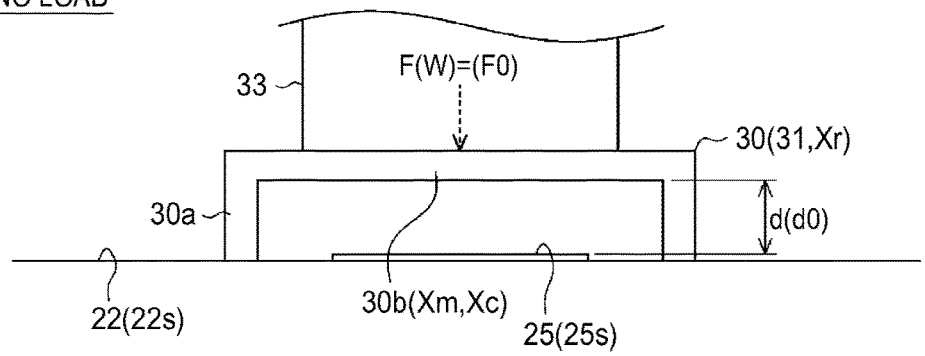
FIG. 8 is an explanatory diagram of an operation of the load sensor (at no load)
Figure 9:
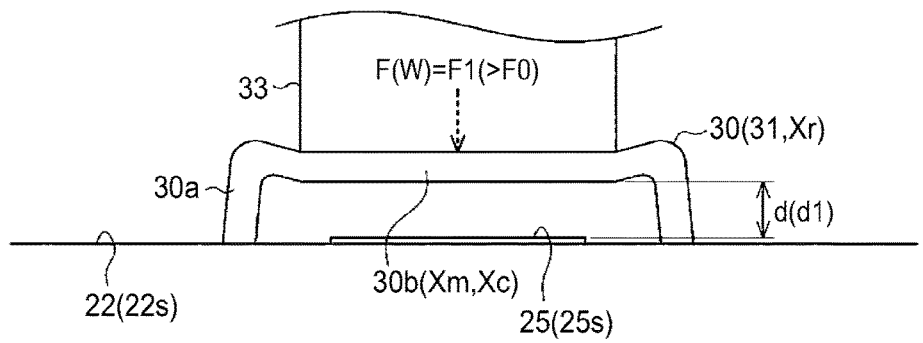
FIG. 9 is an explanatory diagram of an operation of the load sensor (at low load)
Figure 10:
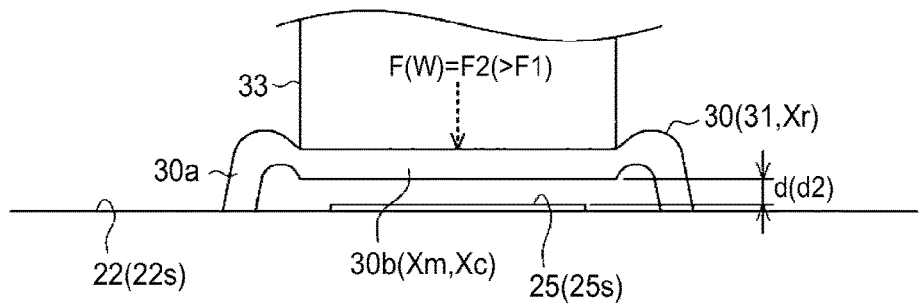
FIG. 10 is an explanatory diagram of an operation of the load sensor (at high load)

As shown in FIGS. 8 to 10, the cover member 30 of the present embodiment is configured so as to be elastically deformed more greatly, as the force pushing down the ceiling portion 30b of the cover member 30 by each of the load transmission members 33 based on the seat load W transmitted to each load transmission member 33 through the cushion pad 13 is larger. Thus, it is configured such that the input load F with respect to the ceiling portion 30b, that is, the relative displacement amount between the ceiling portion 30b and the sensor electrode 25 according to the seat load W is defined.

Specifically, the cover member 30 of the present embodiment is configured such that as the input load F to the ceiling portion 30b increases (F0<F1<F2), the opposing distance d between the ceiling portion 30b and the sensor electrode 25 is reduced (d0>d1>d2). Furthermore, in the cover member 30 of the present embodiment, even in a state where the ceiling portion 30b is pressed down, the portion facing the sensor electrode 25 is kept substantially parallel to the sensor electrode 25. Thus, the area (opposing area s) of the portion facing the sensor electrode 25 is maintained substantially constant.

That is, as represented in the following equation, the electrostatic capacitance C between two mutually opposing conductors is proportional to the opposing area s and dielectric constant c between the two conductors and is inversely proportional to the opposing distance d between them. Therefore, in a case where the opposing area s between two conductors is constant, the shorter the opposing distance d of the two conductors, the larger the electrostatic capacitance C becomes.

$$C = \varepsilon \times (s/d) \quad (1)$$

The dielectric constant ε in the equation is a value obtained by multiplying the dielectric constant ε0 in vacuum by the relative permittivity εr depending on the material (ε=ε0×εr). Thus, the load sensor 11 of the present embodiment is configured such that as the input load F to the ceiling portion 30b of the cover member 30 increases, the electrostatic capacitance C between the ceiling portion 30b of the cover member 30 and the sensor electrode 25 increases.

Figure 11:
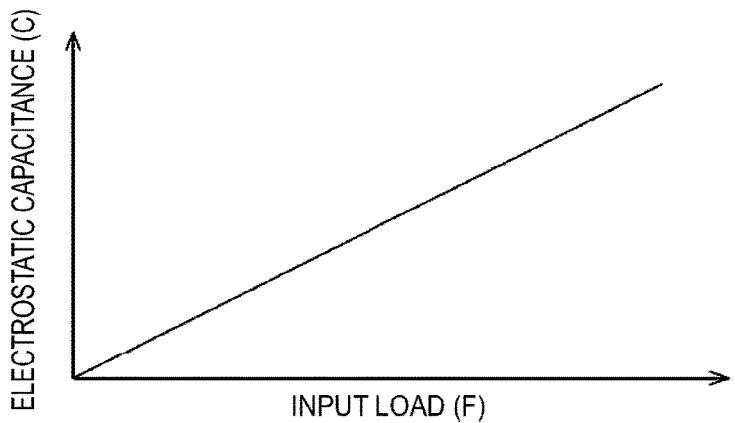
FIG. 11 is a graph showing the relationship between an input load and an electrostatic capacitance.

Specifically, as shown in FIG. 11, the load sensor 11 of the present embodiment is configured such that the electrostatic capacitance C between the ceiling portion 30b of the cover member 30 and the sensor electrode 25 changes substantially in proportion to the input load F to the ceiling portion 30b of the cover member 30. Thereby, the occupant detection apparatus 20 of the present embodiment can detect the seated state of occupant on the seat 1 with high accuracy.

Figure 12:
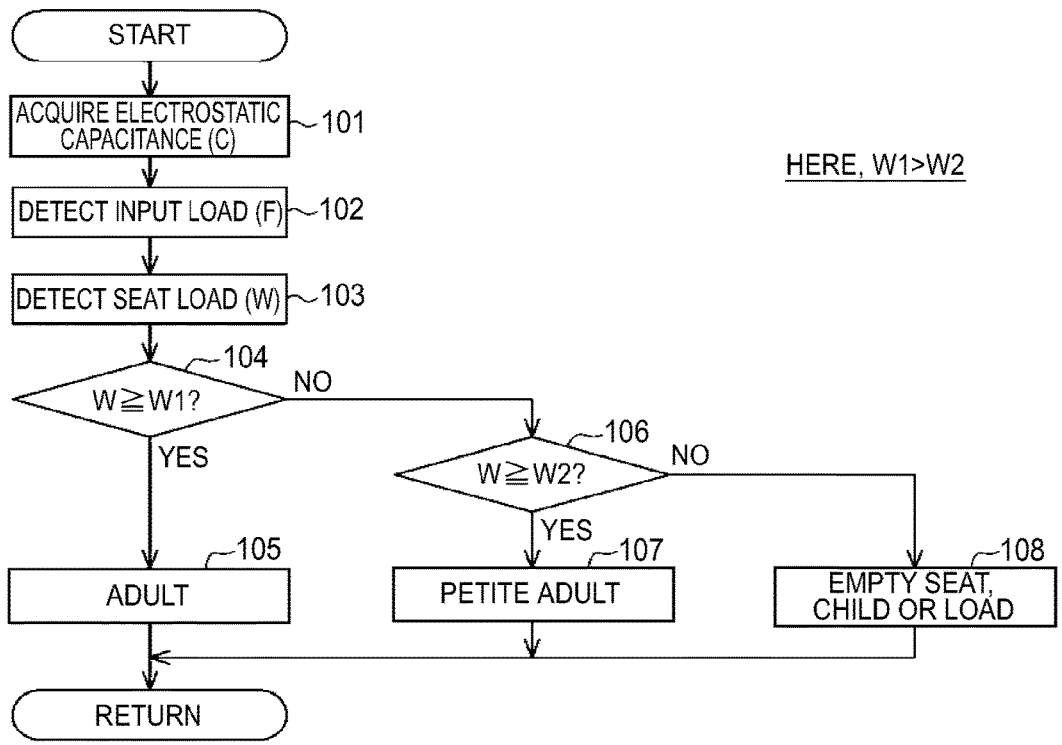
FIG. 12 is a flowchart showing a processing procedure of occupant detection determination.

Specifically, as shown in the flowchart of FIG. 12, in the occupant detection apparatus 20 of the present embodiment, the ECU 15 firstly acquires the detection value of the electrostatic capacitance C between the sensor electrode 25 and the ceiling portion 30b of the cover member 30, indicated by the sensor signal Sd input from the load sensor 11 (step 101). Further, the ECU 15 detects the input load F to the ceiling portion 30b of the cover member 30, based on the acquired detection value of the electrostatic capacitance C (step 102). Then, the ECU 15 of the present embodiment converts the detection value of the detected input load F, thereby detecting the seat load W input to the seating surface 1s of the seat 1 (step 103).

Next, the ECU 15 of the present embodiment determines whether or not the seat load W detected in step 103 is equal to or greater than a predetermined threshold W1 (step 104). In a case where it is determined that the detection value of the seat load W is equal to or greater than the predetermined threshold W1 (YES in step 104), it is determined that an adult occupant is seated on the seat 1 provided with the load sensor 11 (step 105).

In addition, in a case where it is determined that the detection value of the seat load W does not satisfy the predetermined threshold W1 (NO in step 104) in the above-described step 104, the ECU 15 of the present embodiment subsequently determines whether or not the detection value of the seat load W is equal to or larger than a predetermined threshold W2 which is set to a value lower than the predetermined threshold W1 (step 106). In a case where it is determined that the detection value of the seat load W is equal to or greater than the predetermined threshold W1 (YES in step 106), the ECU 15 of the present embodiment determines that a petite adult occupant is seated on the seat 1 provided with the load sensor 11 (step 107).

Further, in a case where it is determined that the detection value of the seat load W does not satisfy the predetermined threshold W2 (NO in step 106) in the above-described step 106, the ECU 15 of the present embodiment determines that an adult occupant is not seated on the seat 1 provided with the load sensor 11. This case is configured such that the seat 1 is recognized as that it is an empty seat, a child occupant is seated, or baggage is placed on the seating surface 1s (step 108).

As described above, according to the present embodiment, the following effects can be obtained.

(1) The load sensor 11 includes a sensor board 22 provided with a sensor electrode 25, a cover member 30 that covers the sensor electrode 25 with a gap between a detection surface 25s of the sensor electrode 25 exposed on a surface 22s of the sensor board 22 and the cover member 30, and a case 21 that houses the sensor board 22 and the cover member 30. The cover member 30 is formed using a conductive rubber 31 having elasticity. The load sensor 11 includes a load transmission member 33 that presses the ceiling portion 30b of the cover member 30 facing the sensor electrode 25 based on the seat load W to elastically deform the cover member 30. The load sensor 11 outputs a sensor signal Sd based on the electrostatic capacitance C between the ceiling portion 30b of the cover member 30 and the sensor electrode 25.

According to the above configuration, the ceiling portion 30b of the cover member 30 functions as the conductor portion Xc facing the sensor electrode 25, and a moving object Xm that is moved by the input of the seat load W and changes the electrostatic capacitance C between the sensor electrode 25 and the conductor portion Xc (see FIG. 8 to FIG. 11).

That is, since a configuration of outputting a sensor signal Sd based on the electrostatic capacitance C between the sensor electrode 25 and the conductor portion Xc facing the sensor electrode 25 is adopted, it is less likely to be affected by the shape change, the position change, or the temperature change occurring in the placement portion relative to the seat 1. Since the cover member 30 including the ceiling portion 30b as the conductor portion Xc facing the sensor electrode 25 shields electric force lines radiated by the sensor electrode 25, it is less likely to be affected by the disturbance, with the liquid such as a beverage placed on the seating surface 1s or the electric device (such as a personal computer) as a noise source. Thus, it is possible to detect a seated state of an occupant on the seat 1, more stably and accurately.

Further, since the cover member 30 formed using the elastic conductive rubber 31 functions as the conductor portion Xc and the moving object Xm, thereby simplifying the configuration and reducing the size of the device. Furthermore, by adopting a configuration in which the sensor board 22 and the cover member 30 provided with the sensor electrode 25 are housed in the case 21 and the seat load W is transmitted to the cover member 30 through the load transmission member 33, high durability and reliability can be secured. The degree of freedom of arrangement can be improved.

(2) The load sensor 11 is configured such that the electrostatic capacitance C between the ceiling portion 30b of the cover member 30 and the sensor electrode 25 changes substantially in proportion to the input load F to the ceiling portion 30b of the cover member 30.

According to the above configuration, the cover member 30 functions as a displacement amount defining unit Xr that defines a relative displacement amount between the ceiling portion 30b and the sensor electrode 25 according to the input load F with respect to the ceiling portion 30b. Then, it is possible to accurately detect the input load F to the ceiling portion 30b, that is, the seat load W input to the seating surface 1s of the seat 1, based on the electrostatic capacitance C between the sensor electrode 25 and the ceiling portion 30b of the cover member 30. Further, based on the detection value of the seat load W, it is possible to perform highly accurate occupant detection, such as, for example, determination of the physique of an occupant sitting on the seat 1 or discrimination of baggage placed on the seating surface 1s. The cover member 30 functioning as the conductor portion Xc and the moving object Xm further functions as the displacement amount defining unit Xr, thereby further simplifying the configuration and miniaturizing the device.

(3) The load sensor 11 is disposed under the cushion pad 13 by fixing the case 21 to the cushion spring 12. It is configured that the cushion pad 13 comes into contact with the pressure receiving end 33b of the load transmission member 33 projecting outside the case 21 from the upper side.

According to the above configuration, even in a case where a shape change or a position change occurs in the frame of the seat 1 due to a seat operation or the like, it is less likely to be affected. Further, for example, it is less likely to be affected by the load input to the seatback 3, such as a rear occupant leaning against the seatback 3. Thus, it is possible to detect a seated state of an occupant on the seat 1, more stably and accurately.

Further, even when a collision occurs, input of a large load is unlikely to occur. Thus, high reliability can be secured. Furthermore, even in a case where the vehicle tilts due to inclination of the road surface or the like, there is an advantage that it is hardly affected by the inclination. Thus, it is possible to detect the seated state of the occupant on the seat 1 with a small number of sensors, accurately, without requiring complicated control logic. In addition, good seating comfort can be secured by interposing the cushion pad 13 between the seating surface 1s and the sensor.

The above embodiment may be modified as follows.

In the above embodiment, in the cover member 30, the ceiling portion 30b is pressed toward the load transmission member 33, such that the portion facing the sensor electrode 25 is elastically deformed in a state of being kept substantially parallel to the sensor electrode 25. Then, in a state where the area of the portion facing the sensor electrode 25 (opposing area s) is maintained substantially constant, it is configured such that the opposing distance d between the ceiling portion 30b and the sensor electrode 25 decreases based on the input load F with respect to the ceiling portion 30b (see FIG. 8 to FIG. 10).

Figure 13A:
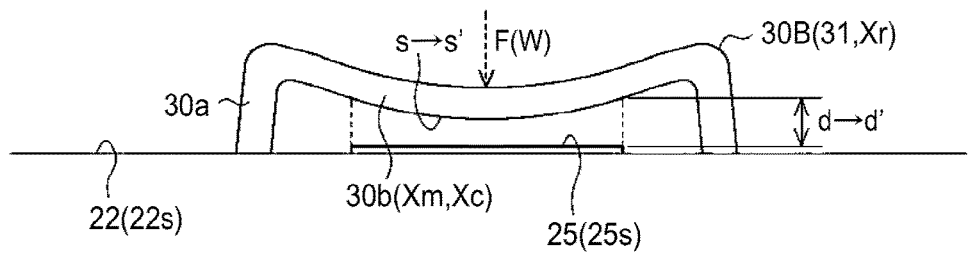
FIGS. 13A and 13B are diagrams showing another example of the load sensor (a: an opposing area change and an opposing distance change, b: an opposing distance change)

However, the embodiment disclosed herein is not limited to this, it may be configured such that as in the cover member 30B shown in FIG. 13A, the ceiling portion 30b is displaced (moved) toward the sensor electrode 25 side by being curved, based on the input load F with respect to the ceiling portion 30b. That is, in a case where such a configuration is adopted, the opposing distance d (average value) between the ceiling portion 30b and the sensor electrode 25 and the opposing area s between them change (d→d', s→s'). Thus, the electrostatic capacitance C between the ceiling portion 30b of the cover member 30 and the sensor electrode 25 may be configured to be changed.

Figure 13B:
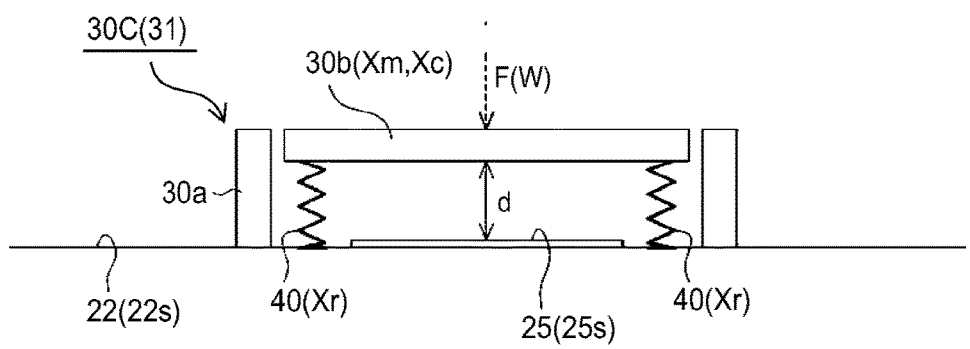

As the cover member 30C shown in FIG. 13B, the ceiling portion 30b and the circumferential wall 30a may be configured to be separated from each other. In this case, the elastic member 40 such as a spring may be interposed between the ceiling portion 30b and the sensor board 22. By adopting such a configuration, while maintaining the state in which the sensor electrode 25 and the ceiling portion 30b are in parallel at a high precision, the ceiling portion 30b can be moved in a direction toward and away from the sensor electrode 25 based on the input load F. Furthermore, since the elastic member 40 provided independently of the cover member 30C functions as the displacement amount defining unit Xr, the relative displacement amount between the ceiling portion 30b and the sensor electrode 25 can be defined more accurately according to the input load F to the ceiling portion 30b, that is, the seat load W. Thus, it is possible to detect a seated state of an occupant on the seat 1 more accurately.

In the above embodiment, the cover member 30 formed using the elastic conductive rubber 31 functions as a conductor portion Xc, a moving object Xm, and a displacement amount defining unit Xr. However, the embodiment disclosed herein is not limited thereto, and the conductor portion Xc, the moving object Xm, and the displacement amount defining unit Xr may respectively be configured to be integrally provided independently or in any combination.

For example, in the configuration of the above embodiment, the material of the cover member 30 is changed to a nonconductive elastic material. The ground electrode may be configured to be fixed to the ceiling portion 30b. In this case, the cover member 30 functions as the displacement amount defining unit Xr. Then, the ground electrode fixed to the ceiling portion 30b of the cover member 30 functions as the conductor portion Xc and the moving object Xm.

Further, the shape of the cover member 30 may be arbitrarily changed. Further, the material of the cover member 30 may also be arbitrarily changed according to its function. For example, in the cover member 30 of the above embodiment, as long as the material is an elastically deformable conductor, it may be a conductive plastic, a metal or the like, without being limited to the conductive rubber 31. In a case where the cover member 30 does not have a function as the conductor portion Xc and the displacement amount defining unit Xr, a material without the properties of the conductor and the elastic member may be used.

Further, for example, in the configuration of the above embodiment, the lid portion 24 of the case 21 is formed using a conductive elastic material (for example, conductive rubber or the like). Furthermore, it is configured that the seat load W is applied to the lid portion 24. By doing so, it may be configured such that the cover member 30 is eliminated. That is, in this case, the lid portion 24 of the case 21 is displaced to the sensor electrode 25 side by the input of the seat load W, such that the lid portion 24 functions as the conductor portion Xc, the moving object Xm, and the displacement amount defining unit Xr. Therefore, even in a case where such a configuration is adopted, it is possible to obtain the same effect as the configuration of the above embodiment.

In the above embodiment, as the ceiling portion 30b of the cover member 30 functioning as the conductor portion Xc and the moving object Xm moves in a direction toward and away from the sensor electrode 25 according to the input load F, the opposing distance d between the sensor electrode 25 and the conductor portion Xc is assumed to be changed. However, the configuration is not limited to this, and the opposing area s between the sensor electrode 25D and the conductor portion Xc may be changed.

Figure 14A:
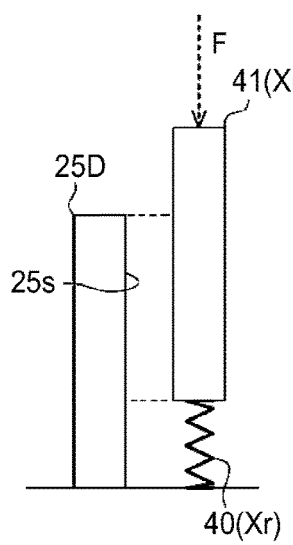
FIGS. 14A to 14C are diagrams showing another example of the load sensor (opposing area change)
Figure 14B:
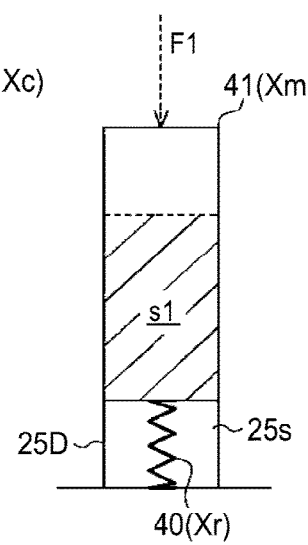
Figure 14C:
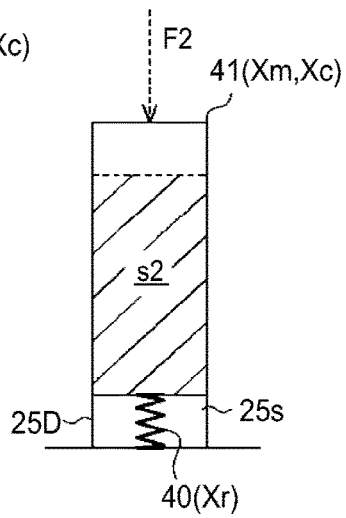

For example, as shown in FIGS. 14A to 14C, the sensor electrode 25D having a substantially flat plate-like outer shape and the conductive member 41 are disposed to face each other. Then, it may be configured such that the conductive member 41 is moved parallel to the sensor electrode 25D according to the input load F.

That is, in this example, the conductive member 41 functions as the conductor portion Xc and the moving object Xm. For example, an elastic member 40 such as a spring is used for the displacement amount defining unit Xr. In this case, for example, as the case 21, a second conductive member which surrounds the sensor electrode 25D and the outer side of conductive member 41 or covers the seating surface direction side of the seat 1 may be separately provided, and shield the electric force lines radiated from the sensor electrode 25 in the seating surface direction of the seat 1, by being used as a shielding portion. In this example, it is configured that as the input load F input to the conductive member 41 is larger (F1<F2), the opposing area s between the sensor electrode 25D and the conductor portion Xc shown in hatching becomes larger in FIGS. 14B and 14C (s1<s2).

Even in a case where such a configuration is adopted, the electrostatic capacitance C between the conductive member 41 and the sensor electrode 25D changes depending on the input load F to the conductive member 41. Incidentally, the shapes of the facing surfaces of the sensor electrode 25D and the conductive member 41 may be arbitrarily changed, for example, such as forming the conductive member 41 into a wedge-shaped flat plate shape. By detecting the electrostatic capacitance C between the conductive member 41 and the sensor electrode 25D, the occupant detection determination similar to the above embodiment can be performed.

Further, the sensor electrode 25D may be configured to also function as the moving object Xm. For example, in the example shown in FIGS. 14A to 14C, the sensor electrode 25D may be configured to move parallel to the conductive member 41. Further, the sensor electrode may be configured to come into contact with and separate from the conductor portion Xc. Therefore, even in a case where such a configuration is adopted, it is possible to obtain the same effect as in the above embodiment.

Figure 15A:
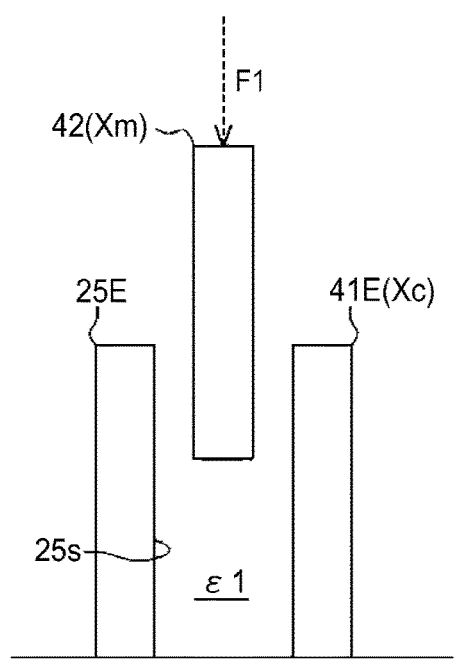
FIGS. 15A and 15B are diagrams showing another example of the load sensor (dielectric constant change).
Figure 15B:
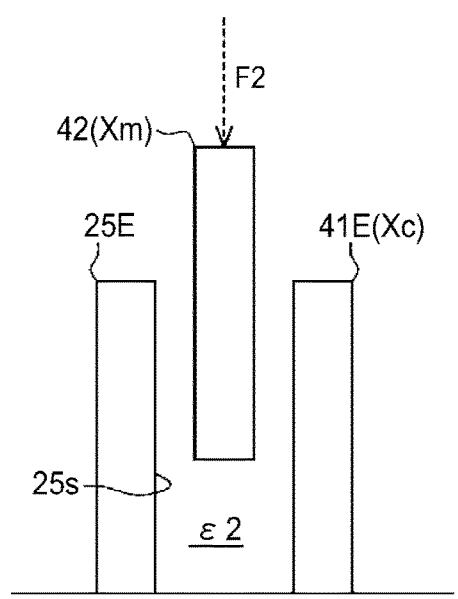

Further, as shown in FIGS. 15A and 15B, for example, it is configured to include a dielectric 42 inserted between a sensor electrode 25E and a conductive member 41E which are facing each other. Then, it may be configured such that the insertion amount of the dielectric 42 is changed according to the input load F.

That is, in this example, the dielectric 42 functions as the moving object Xm. In addition, the dielectric 42 is configured such that the insertion amount with respect to the gap between the sensor electrode 25E and the conductive member 41E is increased as the input load F is larger (F1<F2). Further, in this case, an elastic member such as a spring may be used for the displacement amount defining unit (not shown). That is, in this example, since the dielectric 42 is moved according to the input load F, the dielectric constant $\varepsilon$ between the conductive member 41 and the sensor electrode 25D is changed ($\varepsilon1<\varepsilon2$). Therefore, even in the case of adopting such a configuration, the electrostatic capacitance C between the sensor electrode 25E and the conductive member 41E changes depending on the input load F to the dielectric 42. By detecting the electrostatic capacitance C, occupant detection determination similar to the above embodiment can be performed.

Further, it may be configured such that the dielectric constant $\varepsilon$ and the opposing distance d between the sensor electrode and the conductor portion Xc may be changed, as the moving object Xm moves according to the input load F. Alternatively, it may be configured such that the dielectric constant $\varepsilon$ and the opposing area s between them are changed. Alternatively, it may be configured such that the dielectric constant $\varepsilon$, the opposing distance d, and the opposing area s between them are changed.

The above embodiment is configured such that the electrostatic capacitance C between the ceiling portion 30b of the cover member 30 and the sensor electrode 25 changes substantially in proportion to the input load F to the ceiling portion 30b of the cover member 30, but may not necessarily change proportionally. That is, the displacement amount defining unit Xr may define the relative displacement amount among the input load F (seat load W), the moving object Xm, and the sensor electrode, and finally there may be regularity that can calculate the input load F to the moving object Xm from the electrostatic capacitance C between the ceiling portion 30b constituting the conductor portion Xc and the sensor electrode 25.

In the above embodiment, the ECU 15 detects the input load F to the ceiling portion 30b of the cover member 30, based on the detection value of the electrostatic capacitance C indicated by the sensor signal Sd of the load sensor 11. Further, the seat load W input to the seating surface 1s of the seat 1 is detected by converting the detection value. The physique of an occupant seated on the seat 1 (an adult, a petite adult, a child (or an empty seat) or the like) is detected based on the seat load W.

However, without being limited thereto, as long as the sensor signal Sd output from the load sensor 11 is generated based on the electrostatic capacitance C between the sensor electrode 25 and the conductor portion Xc, it may not necessarily indicate the value of the electrostatic capacitance C itself. For example, it may be an on/off signal indicating the presence or absence of the load input. In this case, the displacement amount defining unit Xr is not necessarily required, and it may only be required that the moving object Xm can return to the position before load input. Further, the output level may be changed in a stepwise manner, according to the detection value of the electrostatic capacitance C. Further, for example, the sensor IC 37, which is a signal output unit mounted on the sensor board 22, detects the input load F to the cover member 30 or the seat load W input to the seating surface 1s of the seat 1, based on the detection value of the electrostatic capacitance C. It may be output as the sensor signal Sd.

Further, regarding the content of the occupant detection determination performed by the ECU 15 based on the sensor signal Sd, it may be possible to detect only the presence or absence of an occupant with respect to the seat 1 as the seated state. For example, it may perform a more detailed occupant detection determination for distinguishing baggage or a child, a child seat, or the like.

In the above embodiment, the load sensor 11 is disposed under the cushion pad 13 by fixing the case 21 to the cushion spring 12, but the arrangement may be arbitrarily changed. For example, it may be configured such that the load sensor 11 may be fixed to the cushion pan below the cushion pad 13.

In the above embodiment, this disclosure is embodied in the load sensor 11 constituting the occupant detection apparatus 20 provided in the seat 1 for a vehicle. However, the embodiment disclosed herein is not limited to this and may be applied to a load detection apparatus used for other use. Even in this case, it may also be possible to detect the value of the input load F or to detect the presence or absence of the load input.

It is preferable that an occupant detection apparatus according to an aspect of this disclosure includes a sensor electrode, a conductor portion facing the sensor electrode, a moving object that moves by input of a seat load loaded on a seat and changes an electrostatic capacitance between the sensor electrode and the conductor portion, and a signal output unit that outputs a sensor signal based on the electrostatic capacitance.

That is, since a configuration of outputting a sensor signal based on the electrostatic capacitance between the sensor electrode and the conductor portion facing the sensor electrode is adopted, it is less likely to be affected by the shape change, the position change, or the temperature change occurring in the placement portion relative to the seat. Since a conductor portion facing the sensor electrode shields electric force lines radiated by the sensor electrode, it is less likely to be affected by the disturbance of which a noise source is liquid such as a beverage placed on the seating surface of the seat or the electric device (such as a personal computer). Thus, it is possible to detect a seated state of an occupant on the seat, more stably and accurately.

It is preferable that the occupant detection apparatus according to the aspect of this disclosure includes a displacement amount defining unit that defines a relative displacement amount between the moving object and the sensor electrode according to the seat load. According to this configuration, it is possible to accurately detect the input load relative to the moving object based on the electrostatic capacitance between the sensor electrode and the moving object, that is, detect the seat load input to the seating surface of the seat. Based on the detection value of the seat load, it is possible to perform highly accurate occupant detection, such as, for example, determination of the physique of an occupant sitting on the seat or discrimination of baggage placed on the seating surface.

It is preferable that the occupant detection apparatus according to the aspect of this disclosure includes a cover member made of an elastically deformable conductor covering the sensor electrode with a gap between the cover member and the sensor electrode. According to this configuration, the cover member can function as a conductor portion and a moving object. Further, it is possible to define the relative displacement amount between the moving object and the sensor electrode according to the seat load, based on the elasticity. This makes it possible to detect the seated state of the occupant on the seat more stably and accurately, and simplify the configuration and miniaturize the device.

It is preferable that the occupant detection apparatus according to the aspect of this disclosure includes a sensor board having the sensor electrode, a case that houses the sensor board and the cover member, and a load transmission member that transmits the seat load to the cover member to elastically deform the cover member.

According to this configuration, high durability and reliability can be secured. The degree of freedom of arrangement can be improved. It is preferable that an occupant detection apparatus for solving the above problems is configured such that the case is fixed to a cushion spring that supports a cushion pad upwards, and the cushion pad comes into contact with the load transmission member from the upper side.

According to the above configuration, for example, even in a case where a shape change or a position change occurs in the frame of the seat due to a seat operation or the like, it is less likely to be affected. Further, for example, it is less likely to be affected by the load input to a seatback, such as a rear occupant leaning against the seatback. Thus, it is possible to detect a seated state of an occupant on the seat, more stably and accurately.

In addition, even when a collision occurs, input of a large load hardly occurs. Thus, high reliability can be secured. Furthermore, even in a case where the vehicle tilts due to inclination of the road surface or the like, there is an advantage that it is hardly affected by the inclination. This makes it possible to detect the seated state of the occupant on the seat, with a small number of sensors, accurately, without requiring a complicated control logic. In addition, good seating comfort can be secured by interposing a cushion pad between the seating surface and the sensor.

It is preferable that the moving object is configured such that the opposing distance between the conductor portion and the sensor electrode changes as the moving object moves.

It is preferable that the moving object is configured such that the opposing area between the conductor portion and the sensor electrode changes as the moving object moves.

It is preferable that the moving object is configured such that the dielectric constant between the conductor portion and the sensor electrode changes as the moving object moves.

According to each of the above-described configurations, it is possible to change the electrostatic capacitance between the sensor electrode and the conductor portion based on the movement of the moving object.

It is preferable that the conductor portion and the moving object are integrally provided.

It is preferable that the sensor electrode and the moving object are integrally provided.

It is preferable that the moving object and the displacement amount defining unit are integrally provided. According to each of the above-described configurations, the configuration can be simplified.

It is preferable that the sensor electrode is provided with a shielding portion for shielding electric force lines radiated in the seating surface direction of the seat. By adopting such a configuration, it is possible to more effectively prevent electric force lines radiated from the sensor electrode, from leaking in the seating surface direction of the seat. Thus, it is possible to detect a seated state of an occupant on the seat, more stably and accurately, by suppressing the influence of disturbance.

It is preferable that a load detection apparatus includes a sensor electrode, a conductor portion facing the sensor electrode, a moving object that moves by input of a load and changes an electrostatic capacitance between the sensor electrode and the conductor portion, and a signal output unit that outputs a sensor signal based on the electrostatic capacitance.

According to the aspect of this disclosure, it is possible to detect a seated state of an occupant on the seat of a vehicle, more stably and accurately.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An occupant detection apparatus comprising:
a sensor electrode;
a sensor board that includes the sensor electrode;
a cover member made of an elastically deformable conductor which is fixed to the sensor board and covers the sensor electrode with a gap between the cover member and the sensor electrode, the cover member integrally provided with a ceiling portion facing the sensor electrode and a circumferential wall that is fixed to the sensor board and covers the sensor electrode; and
a signal output unit that outputs a sensor signal based on electrostatic capacitance,
wherein the cover member moves by input of a seat load loaded on a seat and changes the electrostatic capacitance between the sensor electrode and the ceiling portion.

2. The occupant detection apparatus according to claim 1, further comprising:
a case that houses the sensor board and the cover member; and
a load transmission member that transmits the seat load to the cover member to elastically deform the cover member.

3. The occupant detection apparatus according to claim 2, wherein the case is fixed to a cushion spring that supports a cushion pad upwards, and the cushion pad comes into contact with the load transmission member from the upper side.

4. The occupant detection apparatus according to claim 1, wherein the cover member is configured such that an opposing distance between the ceiling portion and the sensor electrode changes as the cover member moves.

5. The occupant detection apparatus according to claim 1, wherein the cover member is configured such that an opposing area between the ceiling portion and the sensor electrode changes as the cover member moves.

6. The occupant detection apparatus according to claim 1, wherein the cover member is configured such that a dielectric constant between the ceiling portion and the sensor electrode changes as the cover member moves.

7. A load detection apparatus comprising:
a sensor electrode;
a sensor board that includes the sensor electrode;
a cover member made of an elastically deformable conductor which is fixed to the sensor board and covers the sensor electrode with a gap between the cover member and the sensor electrode, the cover member integrally provided with a ceiling portion facing the sensor electrode and a circumferential wall that is fixed to the sensor board and covers the sensor electrode; and
a signal output unit that outputs a sensor signal based on electrostatic capacitance,
wherein the cover member moves by input of a seat load loaded on a seat and changes the electrostatic capacitance between the sensor electrode and the ceiling portion.

* * * * *